(12) United States Patent
Lutnick et al.

(10) Patent No.: US 7,734,484 B2
(45) Date of Patent: Jun. 8, 2010

(54) PRODUCTS AND PROCESSES FOR MANAGING LIFE INSTRUMENTS

(75) Inventors: Howard W. Lutnick, New York, NY (US); Stuart A. Hersch, New York, NY (US)

(73) Assignee: CFPH, LLC, New York, NY (US)

( * ) Notice: Subject to any disclaimer, the term of this patent is extended or adjusted under 35 U.S.C. 154(b) by 579 days.

(21) Appl. No.: 11/550,303

(22) Filed: Oct. 17, 2006

(65) Prior Publication Data

US 2007/0226123 A1    Sep. 27, 2007

Related U.S. Application Data

(60) Provisional application No. 60/727,613, filed on Oct. 17, 2005, provisional application No. 60/733,639, filed on Nov. 4, 2005, provisional application No. 60/752,261, filed on Dec. 19, 2005, provisional application No. 60/752,209, filed on Dec. 19, 2005, provisional application No. 60/841,269, filed on Aug. 30, 2006.

(51) Int. Cl.
*G06Q 40/00* (2006.01)
(52) U.S. Cl. .......................................................... 705/4
(58) Field of Classification Search ...................... 705/4
See application file for complete search history.

(56) References Cited

U.S. PATENT DOCUMENTS

| | | | |
|---|---|---|---|
| 4,969,094 A | 11/1990 | Halley et al. | |
| 5,673,402 A | 9/1997 | Ryan et al. | |
| 5,999,917 A | 12/1999 | Facciani et al. | |
| 6,473,737 B2 | 10/2002 | Burke | |
| 6,684,189 B1 | 1/2004 | Ryan et al. | |
| 6,684,190 B1 | 1/2004 | Powers et al. | |
| 7,519,552 B2 * | 4/2009 | Phelps | 705/35 |
| 2001/0011223 A1 | 8/2001 | Burke | |
| 2002/0042770 A1 | 4/2002 | Slyke et al. | |
| 2002/0116231 A1 | 8/2002 | Hele et al. | |
| 2003/0110061 A1 | 6/2003 | Lakenbach et al. | |
| 2004/0044609 A1 * | 3/2004 | Moore | 705/37 |
| 2004/0064391 A1 * | 4/2004 | Lange | 705/36 |
| 2004/0177021 A1 * | 9/2004 | Carlson et al. | 705/36 |
| 2004/0267647 A1 * | 12/2004 | Brisbois | 705/35 |
| 2005/0177473 A1 * | 8/2005 | Angle | 705/30 |

(Continued)

FOREIGN PATENT DOCUMENTS

WO    WO 2007/047605    4/2007

OTHER PUBLICATIONS

International Search Report on Patentability for International Application No. PCT/US2006/040427, dated Jul. 31, 2007 (1 page).

(Continued)

*Primary Examiner*—Jagdish N Patel
*Assistant Examiner*—Kevin Poe
(74) *Attorney, Agent, or Firm*—Ruth J. Ma

(57) ABSTRACT

According to an embodiment, a method includes accessing a listing of a plurality of profiles of life insurance policies. A profile is selected from the listing, and the trading status of the profile can be viewed. A buy command or sell command is submitted to an exchange system to trade the life insurance policy that is associated with the selected profile.

21 Claims, 13 Drawing Sheets

U.S. PATENT DOCUMENTS

| | | |
|---|---|---|
| 2005/0246267 A1 | 11/2005 | Nichols |
| 2006/0122871 A1 | 6/2006 | Cowley et al. |
| 2006/0178979 A1* | 8/2006 | Levine et al. ............... 705/37 |
| 2006/0287894 A1* | 12/2006 | Weiss et al. ................ 705/4 |
| 2006/0293990 A1 | 12/2006 | Schaub |
| 2007/0050217 A1 | 3/2007 | Holden |
| 2007/0226015 A1 | 9/2007 | Lutnick et al. |
| 2007/0299760 A1* | 12/2007 | Lange et al. ............ 705/36 R |
| 2008/0183507 A1 | 7/2008 | Lutnick et al. |
| 2009/0192832 A1* | 7/2009 | Phelps ........................ 705/4 |

OTHER PUBLICATIONS

International Preliminary Report on Patentability for International Application No. PCT/US2006/040427, dated Apr. 23, 2008 (4 pages).

U.S. Appl. No. 11/613,182, filed Dec. 19, 2006, Lutnick, et al.

U.S. Appl. No. 11/847,982, filed Aug. 30, 2007, Lutnick, et al.

Australian Examiner's Report for Application No. 2006304414, dated Aug. 14, 2009 (3 pages).

USPTO Office Action for U.S. Appl. No. 11/847,982, Oct. 5, 2009 (11 pages).

USPTO Office Action for U.S. Appl. No. 11/613,182, Jun. 25, 2009 (8 pages).

* cited by examiner

600

| PROFILE | |
|---|---|
| Policy Holder | |
| Gender | Male |
| Date of Birth | June 15, 1961 |
| Height | 5 feet 3 inches |
| Weight | 140 lbs |
| Tobacco or Nicotine Use | current user |
| Marital Status | single |
| Occupation | self-employed |
| Race | white |
| Religion | XXXX |
| State of Residence | New York |
| Credit rating | Good |
| Life Expectancy | 7 years |
| Life Expectancy Evaluator(s) | Andrew B. Smith |
| Consistency Evaluator(s) | Robert Jones |
| Insurance Company | |
| Company Name | MetLife |
| Policy amount | $1 million |
| Date of maturation | April 14, 2015 |
| Premium Payments | $200 monthly |
| Number of Payments remaining | 42 |
| Moody's Insurance Company Rating | A1 |
| Cash Value | $600,000 |
| Type of Policy | Universal |
| Bid Price | $650,000 |
| Ask Price | $710,000 |
| Last Sale Price | $700,000 |

| 711 | Policy Holder | 716 | None | 714 |
| 713 | Gender Date of Birth | | | |
| 710 | Height | 712 | ft  inch | |

715   715

| 721 | Insurance | 724 | MetLife | 725 |
| 722 | Company name Policy amount | 723 | $100,000 | |
| 720 | Date of maturation | | | |

715   715

| 761 | Trade Information | 763 | None | 765 |
| 762 | Last Sale Price | 764 | | |
| 760 | | 715  715 | | |

740 — Settlement or Group of Settlements Fitting Criteria

750 — See settlement profiles

770 — List current settlement contracts and/ or policy trade information

FIG. 7

| Settlement Symbol | Open | Hi/Low | Last | Change | Bid | Ask | Policy Amount |
|---|---|---|---|---|---|---|---|
| JHONCR | $ 610,000 | 750,000/600,000 | $ 610,000 | 0 | $ 590,000 | $ 650,000 | $ 1.25 Million |
| NIRLM | $ 350,000 | 400,000/320,000 | $ 360,000 | +10,000 | $ 380,000 | $ 400,000 | $ 750,000 |
| BARLM | $ 210,000 | 500,000/190,000 | $ 200,000 | -10,000 | $ 205,000 | $ 215,000 | $ 600,000 |
| 910 | 920 | 930 | 940 | 950 | 960 | 970 | 980 |

FIG. 9

PRODUCTS AND PROCESSES FOR MANAGING LIFE INSTRUMENTS

The present Application claims the benefit of the following U.S. Applications:

(i) U.S. Provisional Patent Application Ser. No. 60/727,613 entitled "Systems and Methods for Electronically Trading Insurance Policies", filed Oct. 17, 2005;

(ii) U.S. Provisional Patent Application Ser. No. 60/733,639 entitled "Systems and Methods for Electronically Trading Insurance Policies", filed Nov. 4, 2005;

(iii) U.S. Provisional Patent Application Ser. No. 60/752,261 entitled "Systems and Methods for Electronically Trading Insurance Policies", filed Dec. 19, 2005;

(iv) U.S. Provisional Patent Application Ser. No. 60/752,209 entitled "Systems and Methods for Providing Electronic Calculation of a Conversion of a Lump Sum Life Settlement to/from Periodic Payments", filed Dec. 19, 2005; and (v) U.S. Provisional Patent Application Ser. No. 60/841,269 entitled "Products and Processes for Indicating Documents for a Life Based Product", filed Aug. 30, 2006.

Each of the above-referenced Applications are incorporated by reference herein as part of the present disclosure for purposes of written description and enablement only.

BRIEF DESCRIPTION OF DRAWINGS

FIG. 6 illustrates a life settlement profile in accordance with an embodiment.

FIG. 7 illustrates an interface for selecting a settlement contract that may be presented in accordance with an embodiment.

FIG. 9 illustrates an interface for displaying the results of a search for settlement profile trading information in accordance with an embodiment.

DETAILED DESCRIPTION

Figure 1:
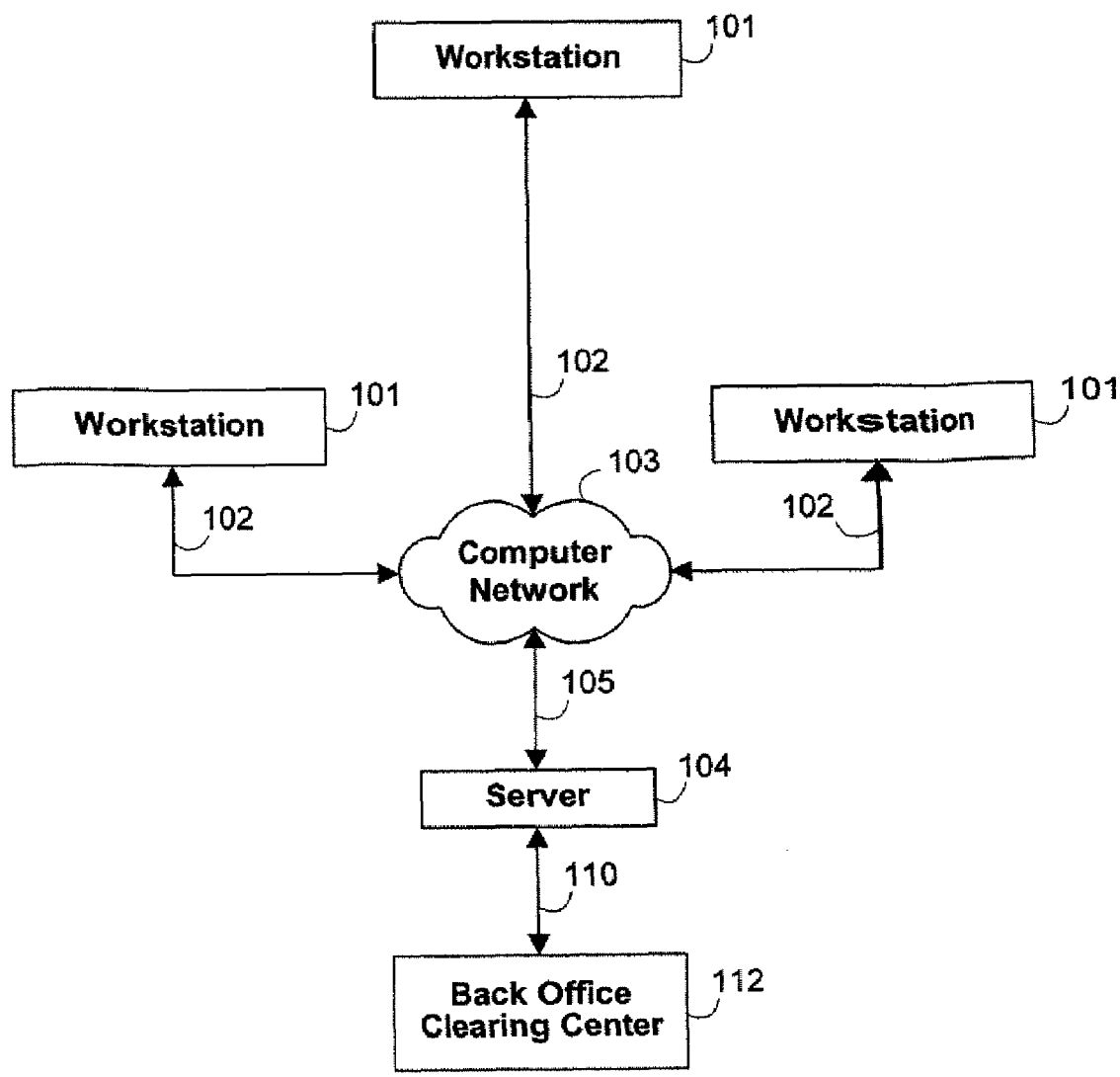
FIG. 1 illustrates an electronic implementation of a system to buy or sell life settlement contracts in accordance with an embodiment.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

VII. 35 U.S.C. §112, paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "not included" or the like.

IX. Incorporation by Reference

Any patent, patent application or other document referred to herein is incorporated by reference into this patent application as part of the present disclosure, but only for purposes of written description and enablement, and should in no way be used to limit, define, or otherwise construe the terms of the present application where the present application, without incorporating that material, would not have failed to provide an ascertainable meaning, but rather would have provided a meaning to such term. Nothing incorporated by reference should be used in any way to limit, define, or otherwise construe the terms of the present application. The mere incorporation by reference does not endorse, ratify or acquiesce in any statements, opinions, arguments or characterizations contained therein.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application.

XI. Embodiments

Various embodiments are directed to life instruments, and products and processes for facilitating transactions involving life instruments. For example, various embodiments are directed to products and processes which facilitate the buying, offering to buy, selling and offering to sell of life instruments.

As used herein, a "life instrument" refers to an instrument (e.g., a financial instrument) that has a value or other feature that depends on the lifetime of one or more persons.

As used herein, a "life instrument" includes:
(1) a life insurance policy;
(2) any instrument in which either
   (i) the time(s) one or more payments are made, payable, due, accrued, etc., or
   (ii) the amount of payment (including whether to pay at all), is based on when an individual dies;
(3) a life annuity;
(4) any instrument in which payments (e.g., periodic payments) of various payment amounts (e.g., each payment of the same amount, payments increase according to a schedule) are made until a time that is based on when one or more individuals die;
(4) any instrument in which one or more payments stop, become not due, become not payable, un-accrue, are refundable, etc. based on when an individual dies;
(5) any instrument in which the value (e.g., the return) to the seller of such an instrument is based on when one or more individuals die.

A life policy may include other features as well as any of the features listed above. For example, a life policy may include other features as well as a feature ion which the time one or more payments are made is based on when an individual dies.

Further, various embodiments of the present invention are applicable to instruments that are based on one or more life instruments. Specifically, the embodiments described herein as relating to a life instrument are equally applicable to other instruments, including the following:
(a) an index which defines a set of life instruments (e.g., a set of life instruments which all possess specified characteristics);
(b) instruments based on such an index;
(c) options, futures and other derivatives that are based on one or more life instruments;
(d) instruments which are based on one or more portions of one or more life instruments;
(e) any combination of the above.

The above list of other instruments shall not be interpreted as limiting the meaning of "life instrument". For example, something may fall under the definition of a "life policy" and also fall under the definition of one or more things listed above under "other instrument".

A life insurance policy may define one or more of several features, including:
(1) a death benefit (e.g., a predetermined amount of payment such as $1,000,000);
(2) a beneficiary who is entitled to receive the death benefit;
(3) an insured individual (e.g., upon whose death the death benefit is payable); and
(4) an owner, which is often the insured individual.

A "life insurance policy" may include various other features. For example, a life insurance policy may include an obligation (on the owner of the life insurance policy) to have payments made (e.g., periodic payments made to an insurance company during a period of insurance coverage) in exchange for the right to have the death benefit paid to the beneficiary. As another example, a life insurance policy may have a "cash surrender value", which is an amount paid to the owner of a life insurance policy in exchange for terminating the life insurance policy (e.g., ending the period of insurance coverage, ending the obligation to have payments made, ending the right to have the death benefit paid to the beneficiary).

Some types of life insurance policies include: a term life insurance policy, a whole life insurance policy, and a universal life insurance policy.

A "term life insurance policy" is typically a policy that provides a stated benefit upon death of the policy's owner, provided that the death occurs within a specific time period (e.g., anytime before a predetermined date, anytime before the insured reaches a predetermined age). Typically, the policy does not provide any other returns (e.g., payment) beyond the stated death benefit, unlike a life insurance policy that includes a savings component.

A "whole life insurance policy" is typically a policy that provides for insurance coverage for the life of the insured individual. Unlike a term life insurance policy, which provides coverage for a specific time period, upon the inevitable death of the insured individual, the death benefit is made to the policy's beneficiaries. A "whole life insurance policy" typically also includes an investment component, which accumulates a cash value that the owner can withdraw or borrow against.

A "life annuity" may define one or more of several features, including:

(1) annuity payments (e.g., periodic payments of a specified amount);
(2) a time period during which payments are made, due, paid, payable, accrued or the like;
(2) an annuitant, who is entitled to receive the payments;
(4) an owner, which is often the insured individual.

Generally, an annuity involves series of payments (typically fixed payments) paid (to an "annuitant" by an entity such as an insurance company) over a specified period of the annuity (typically paid at regular intervals).

In addition, an annuity may also feature payments are payable to the annuitant only after one or more investment payments are paid "into" the annuity.

An embodiment includes an apparatus which permits the "listing" of a life instrument. The listing of a life instrument includes the making available to others of certain information relating to the life instrument. For example, a life instrument may be listed so that it may be bid on by potential purchasers of the life instrument.

The terms "insurance company" or "insurance companies" are used herein to refer to any entity or entities that issues any insurance policy or other life instrument. Such entities may, e.g., set certain guidelines for the payment terms of premiums.

In an embodiment, the first step to purchasing a life insurance policy requires the individual to receive a medical evaluation. This evaluation may be used to determine the life expectancy of the individual. Based on this evaluation, policy amount, and/or a variety of other terms and factors, the insurance company sets forth the premiums to be paid by the insured.

Some insurance policies may build up cash value.

The terms of many insurance policies enable the insured to obtain the cash value of the policy prior to the policy's settlement if the insured terminates the policy. However, the true value of a policy may not equate with the cash value set forth on the insurance policy.

As an alternative to the insurance company, a third party may purchase the insurance policy. The third party purchaser may offer cash or other payments to the insured, whereby the purchaser receives the beneficial interest in the insurance policy in return for providing the insured with an agreed upon payment. Such settlements may be greater or less than the cash value of the policy or the amount offered by the insurance company and may increase the desires of the insured to sell the right to his policy benefit to the third party.

Such settlements enable the purchaser to claim the policy benefit upon death of the insured. In such a settlement, it is common that the purchaser assumes all the responsibilities set forth in the policy for the owner. Examples of such responsibilities may include paying monthly premiums. Such settlements are generally known as life settlements (for purposes of this patent application, the term "life settlement" should be understood to include but not be limited to the sale, assignment, transfer, devise, lease, or bequest of the death benefit or any portion of an insurance policy or certificate of insurance for compensation less than the expected death benefit of the insurance policy or certificate).

It should be noted that a subset of life settlements is known as a viatical settlement. However, viatical settlements are generally understood to refer to the purchase of policies and/or settlement contracts from individuals with a life expectancy of less than 24 months. The present invention is directed towards life settlements and may also apply to viatical, or any other types of settlements regarding the sale, assignment, transfer device or lease of the beneficial interest in any insurance policy.

The following illustrative example describes a life settlement between two parties. It should be understood that the parties can represent more than one person. The two parties in the following example are "Person A" representing a policyholder, and "Person B" representing the purchaser(s): Person A applies for a policy valued at $1 Million. The insurance company determines, based on the life expectancy of Person A, the monthly premiums for Person A's policy. After a period of time, Person A may decide he wants to terminate the policy early.

The insurance company may offer a sum of money in response to a request for a termination of the policy. The terms of the policy typically dictate the amount of the insurance company's offer. The person can terminate the policy and receive the amount as dictated by the policy or the insurance company. If Person A accepts the offer as suitable, the insurance company is relieved from their obligation to pay the death benefit to the beneficiaries of the policy upon the death of Person A. Person B may offer Person A a sum greater than the insurance company's offer in exchange for becoming a beneficiary on the policy. If this offer is accepted, Person B may claim the death benefit upon the death of Person A. However, Person B may be required to assume the responsibilities of the policyholder as set forth in the terms of the policy, and thus may be obligated to pay the monthly premiums. This is the life settlement contract offered by Person B. If Person A chooses to accept this settlement, he may assign, transfer, devise, lease, or bequest the benefits of the insurance policy to Person B and collect the sum offered by Person B in the transaction.

At this point, the new policyholder, Person B, may further trade, lend, securitize or dispose of the settlement contract in any other appropriate manner. For example, Person B may wish to sell the settlement contract or a portion of it to other purchaser(s). In turn, another purchaser may wish to purchase the settlement contract from Person B for a purchase price that is higher or lower than the initial amount paid to Person A by Person B.

The description above illustrates how insurance policies have become financial products with the same potential to be traded, securitized, etc., as other financial products. These financial products, may also be further retraded by new owners, who may not have been the policyholders. In fact, a substantial market, projected to represent in excess of five billion dollars in policy value in 2005 alone, has evolved for trading insurance policies and/or life settlement contracts. Nevertheless, the trading methods associated with the market remain arcane and outdated. This substantial market continues to be traded by a limited number of brokers using sub-optimal trading methods.

The following are some examples of discussions in the relevant literature concerning life insurance contracts as financial products:

Various embodiments provide an electronic trading environment in which life insurance policies and/or settlement contracts and other insurance policies, settlement contracts relating thereto, or financial instruments may be submitted, created, checked, sorted, searched, and/or traded. Preferably, the electronic trading environment would serve to increase the transparency and concomitant liquidity associated with electronic trading of insurance-related settlement contracts, which include life settlements and settlement contracts related to other insurance policies.

In an embodiment, a user may be able to electronically submit, check, search, sort, purchase, and/or sell one or more insurance-related settlement contracts and/or policies, such as life settlement contracts and/or policies, using a computer-based settlement trading system. The system may preferably be used to search a database of settlement contracts and/or policies and list a number of life settlement contracts and/or policies in response to user-specified selection criteria (e.g., through a database query). The criteria may correlate to a subset of any number of attributes of, or fields available in, a life insurance policy, contract, and/or standardized profile. Additionally, the criteria may include an exceptions menu based on unique aspects of the life insurance policy and/or contract or group of life insurance policies and/or contracts. It should be noted that this aspect of the invention is applicable to other types of insurance policies, contract relating thereto, or any other similar financial instrument.

Based on this information, the user may then view the complete policy, contract, and/or profile, view the settlement contract and/or policy trade status, and/or execute a trade. The executed trade may or may not require transfer of the beneficial interest of a policy. For example, a right in a policy may be bought and sold by more than one purchaser before transferring the beneficial interest on the policy.

Various embodiments provide a system and method for rating the value of a policy based on a plurality of factors. In one embodiment of the invention, the system may also use existing rating systems to provide some or all of the necessary factors, as will be described in more detail below. The system may give each individual settlement profile a rating which is indicative of the value of the investment. This rating may be based on a plurality of factors that may include the policyholder's life expectancy, the financial well-being of the policyholder's insurance company, or with respect to other insurance policies, the factors related most closely thereto. Such rating enables the pricing of a particular policy.

However, some of the costs associated with performing such ratings may not justify trading policies and/or life settlement contracts that have values that fall below a particular threshold. Accordingly, it is yet another object of the invention to trade such policies and/or life settlement contracts individually or in clusters without rating them.

Various embodiments provide systems and methods for submitting one or more policies and/or life settlement contracts in an electronic market to receive the best offer in a request for quote (RFQ) environment.

Various embodiments provide systems and methods for advancing and preferably electronically executing the necessary interactions with the parties involved in creating an electronic market for insurance-related settlements.

Various embodiments relate to creating systems and methods to assist the submission, creation, status checking, sorting, searching, and/or trading of insurance-related instruments—e.g., contracts that represent the purchase of an insurance policy. The following embodiments of the invention relate to life settlement contracts. Nevertheless, these embodiments do not limit the invention to this particular subject matter. Rather, such embodiments are provided for illustration of the invention and not to limit it to a particular type of insurance policy or instrument.

Typically, life settlement contracts are between two parties—i.e., a seller and a purchaser of the policy. Once the purchaser purchases the policy, he typically waits until the policyholder dies to collect the money for the policy from the insurance company. In the meantime, the purchaser may be obligated to pay the monthly premiums and assume responsibility in place of the policyholder in order for the policy to remain active.

Owing to the relatively limited exposure of the life settlement market, individuals with life insurance policies typically are limited to a relatively small number of purchasers. As a result, the policyholders typically receive a lower compensation than may be possible in a market having more purchasers. Preferably, systems and methods according to the invention alleviate this problem. A purpose of the systems and methods of the invention is to increase the transparency and concomitant liquidity of the life settlement market and, thereby, to provide individuals seeking life settlements the best value for their policies.

Referring to FIG. 1, exemplary system 100 for implementing the invention is shown. As illustrated, system 100 may include one of more workstations 101.

Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 may be used to process and settle executed trades of settlement contracts.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a general packet radio service (GPRS) network, or any combination of any of the same. Communications links 102 and 105 may be any communications links suitable for communicating data between workstations 101 and server 104, such as network links, dial-up links, wireless links, hard-wired links, fiber-optical links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to enter into and proceed with the trades that relate to the invention, and display trade, benchmark, status, or spread information to users of system 100.

Back office clearing center 112 may be any suitable equipment, such as a computer, a laptop computer, a mainframe computer, etc., or any combination of the same, for causing trades to be cleared and/or verifying that trades are cleared. Communications link 110 may be any communications links suitable for communicating data between server 104 and back office clearing center 112, such as network links, dial-up links, wireless links, hard-wired links, fiber-optical links, etc.

Figure 2:
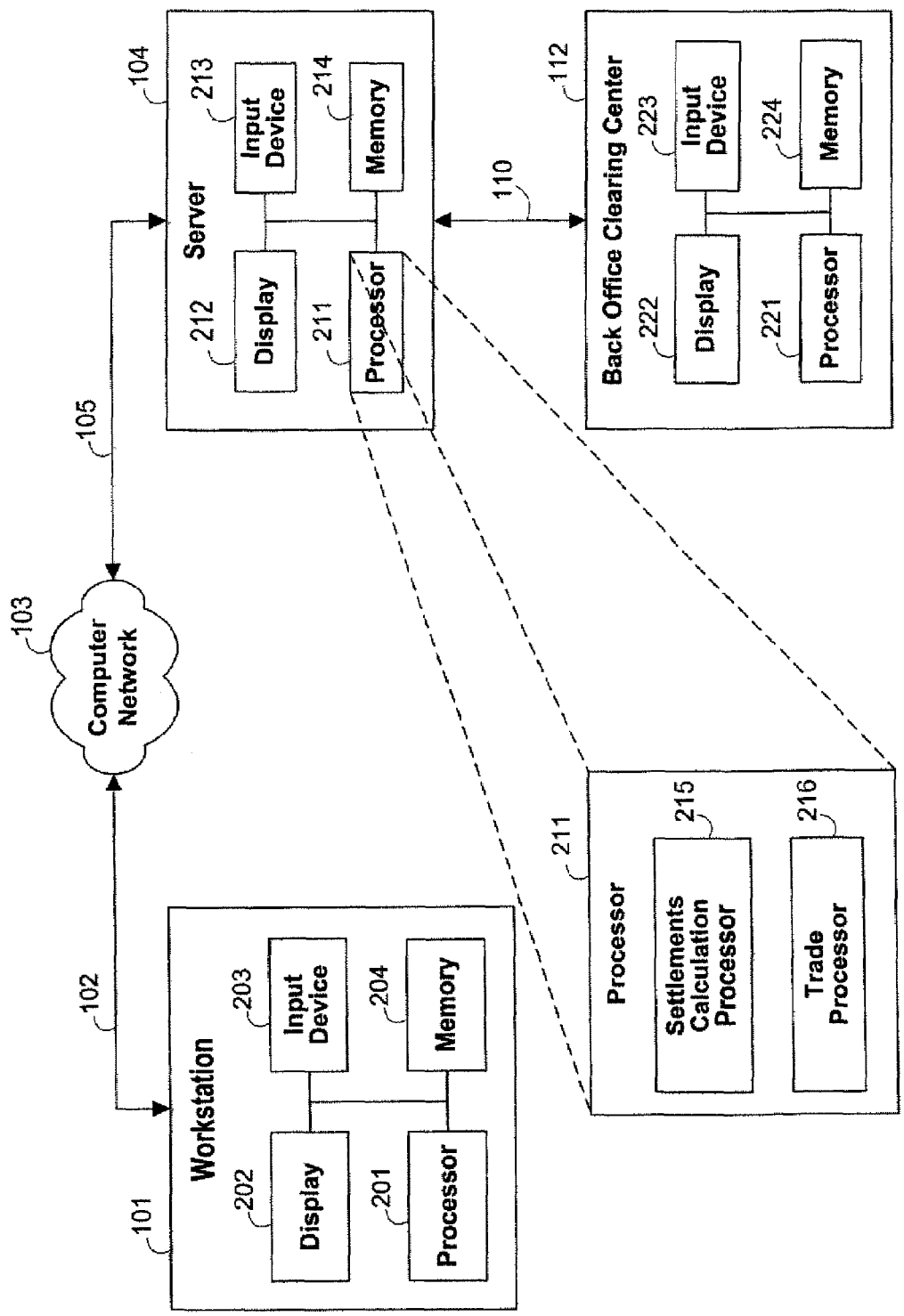
FIG. 2 is an illustration, in greater detail, of an electronic implementation of a system to buy or sell life settlement contracts in accordance with an embodiment.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Processor 201 may use the workstation program to present on display 202 trade information relating to bids, offers, executed trades, and insurance policy and/or profile information such as status and query results to a user of workstation 101. Processor 201 may run any of the processes shown in flow diagrams of FIGS. 3, 4, 10, 11, and 12. Display 202 may be used to view any portion of FIGS. 5, 6, 7, 8, or 9. Furthermore, input device 203 may be used by the user to submit insurance policies and/or settlement contracts, search existing ones, view the status of submitted policies and/or contracts, enter such bids and offers on them, modify the bids and offers, and enter into trades involving the policies themselves and/or settlement contracts for the insurance policies.

Server 104 may include processor 211, display 212, input device 213, and memory 214, which may be interconnected. In a preferred embodiment, memory 214 contains a storage device for storing settlement contracts (e.g., in a database) as well as trade information relating to the trades. The storage device further contains a server program for controlling processor 211. Processor 211 uses the server program to receive, sort, and search settlement contracts, and transact the purchase and sale of the settlement contracts. Processor 211 may include settlement calculation processor 215 that may be implemented to determine the benchmark values based on market conditions or other criteria that may relate to the insurance policy contracts. Processor 211 may run any of the processes shown in the flow diagrams of FIGS. 3, 4, 10, 11, and 12. Processor 211 may include trade processor 216 that executes and processes trades.

Back office clearing center 112 may include processor 221, display 222, input device 223, and memory 224, which may be interconnected. In a preferred embodiment, memory 224 contains a storage device for storing a clearing program for controlling processor 221. Processor 221 uses the clearing program to clear executed trades. Clearing executed trades may preferably include exchanging currency for a future commitment.

Figure 3:
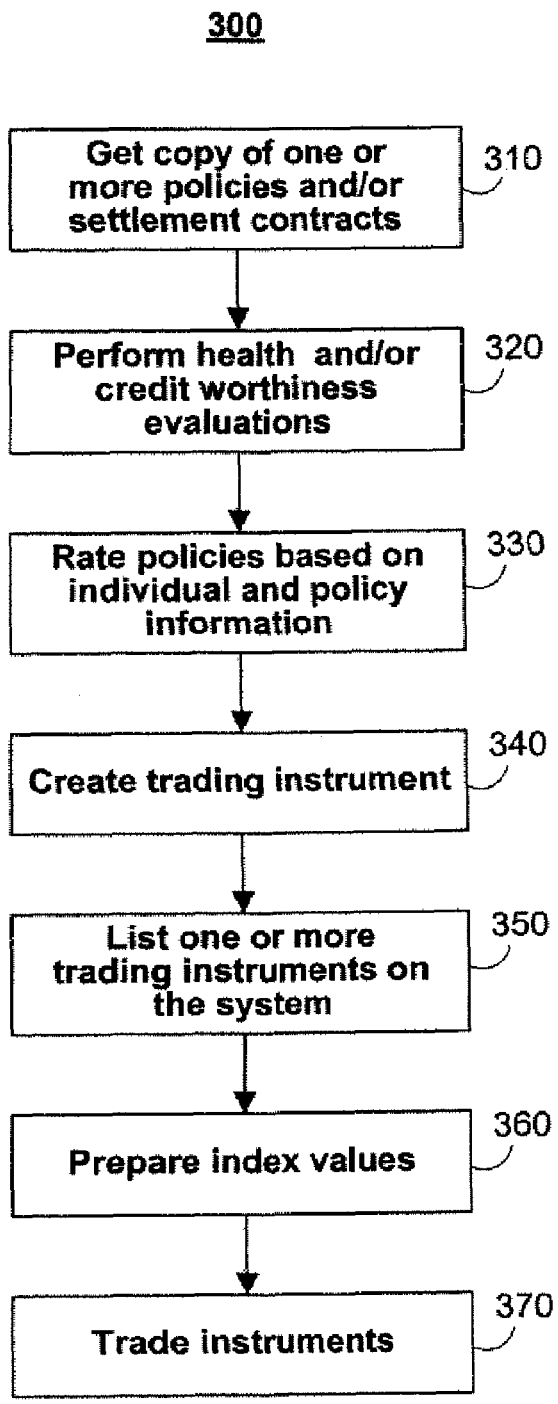
FIG. 3 illustrates a flow chart representing the process of offering a settlement contract for one or more life settlement contracts based on one or more standardized settlement profiles in accordance with an embodiment.

FIG. 3 shows a flow chart 300 representing the process by which a life settlement policy and/or contract may be obtained and submitted to server 104 of FIG. 1. Any steps that may be necessary in this process and that may not be shown can be seen in a more detailed interactions diagram in FIG. 10. The process may be run by processor 201 of FIG. 2 and begins at step 310 with a company, individual, collection of individuals, any combination of the same, or any other entity obtaining a copy of one or more policies and/or settlements contracts for the purposes of trading. The one or more policies and/or settlement contracts may be electronically submitted by the entity through any one of workstations 101 of FIG. 1. If a new policy that has not yet been sold by the policyholder is being submitted, a company, an individual, a collection of individuals, any combination of the same, or any other entity may provide a contract to the policyholder describing the risks and agreements set forth by the life settlement rules and regulations.

At the next step 320 a life expectancy evaluation may or may not be performed on the policyholder to determine his life expectancy. Also, a creditworthiness evaluation may or may not be performed on the policyholder's insurance company. This creditworthiness evaluation may be based on existing ratings of the insurance company. Ratings may be performed by companies such as Standard & Poor, Moody, etc., or any other suitable or accepted ratings agency. Systems and methods according to the invention that are used for the evaluation and the performance of steps other than the ones shown in FIG. 3 will be more clearly illustrated in the description of FIG. 10. The policyholder's life expectancy may be based on physical health—e.g., illnesses, any medical condition as such, etc., mental health, credit rating, drug or alcohol use, marital status, gender, age, height, weight, occupation, race religion, geographic location, etc. The creditworthiness evaluation of the insurance company associated with the policy may be based on the company history, length of operation, lawsuits, reliability, financial worth, public rating, outstanding settlements, etc.

Once the life expectancy and credit evaluations are performed (neither of which is a required step), step 330 may or may not rate the policies and/or contracts at least based on the policyholder's life expectancy and/or existing ratings of the creditworthiness of the policyholder's insurance company. Such a rating enables the pricing of the policies and/or contracts. The rating system may include any number of equations that manipulate the policyholder's life expectancy and/or existing ratings of the creditworthiness of the policyholder's insurance company as evaluated using any number of mathematical functions, formulas, theories, etc., or any combination of the same.

However, some of the costs associated with performing such ratings, such as the costs of performing life expectancy and/or credit evaluations, fixed. These and/or other costs may not justify trading policies and/or settlement contracts that have values that fall below a particular threshold or within a particular range of policy values. Performing such ratings may not be justified because of the limited profits that can typically be realized from trading such policies and/or life settlement contracts. Accordingly, in other embodiments of the invention, such policies may be grouped together in order to trade them in "clusters" without rating them. Each cluster may then be traded. Alternatively, such policies and/or life settlement contracts may be traded individually without being rated. In other embodiments, the clusters or individual policies and/or contracts may instead be priced in accordance with a more suitable (e.g., less costly) pricing method.

The trading instrument(s) created at step 340 may be a cluster of policies and/or contracts or may include any or all the information relating to the policyholder's life expectancy and/or creditworthiness evaluations of the policyholder's insurance company, respective ratings, or any combination of the same. The trading instrument may be used to submit the policies and/or contracts on server 104 for trading by workstation 101 shown at step 350.

Figure 5:
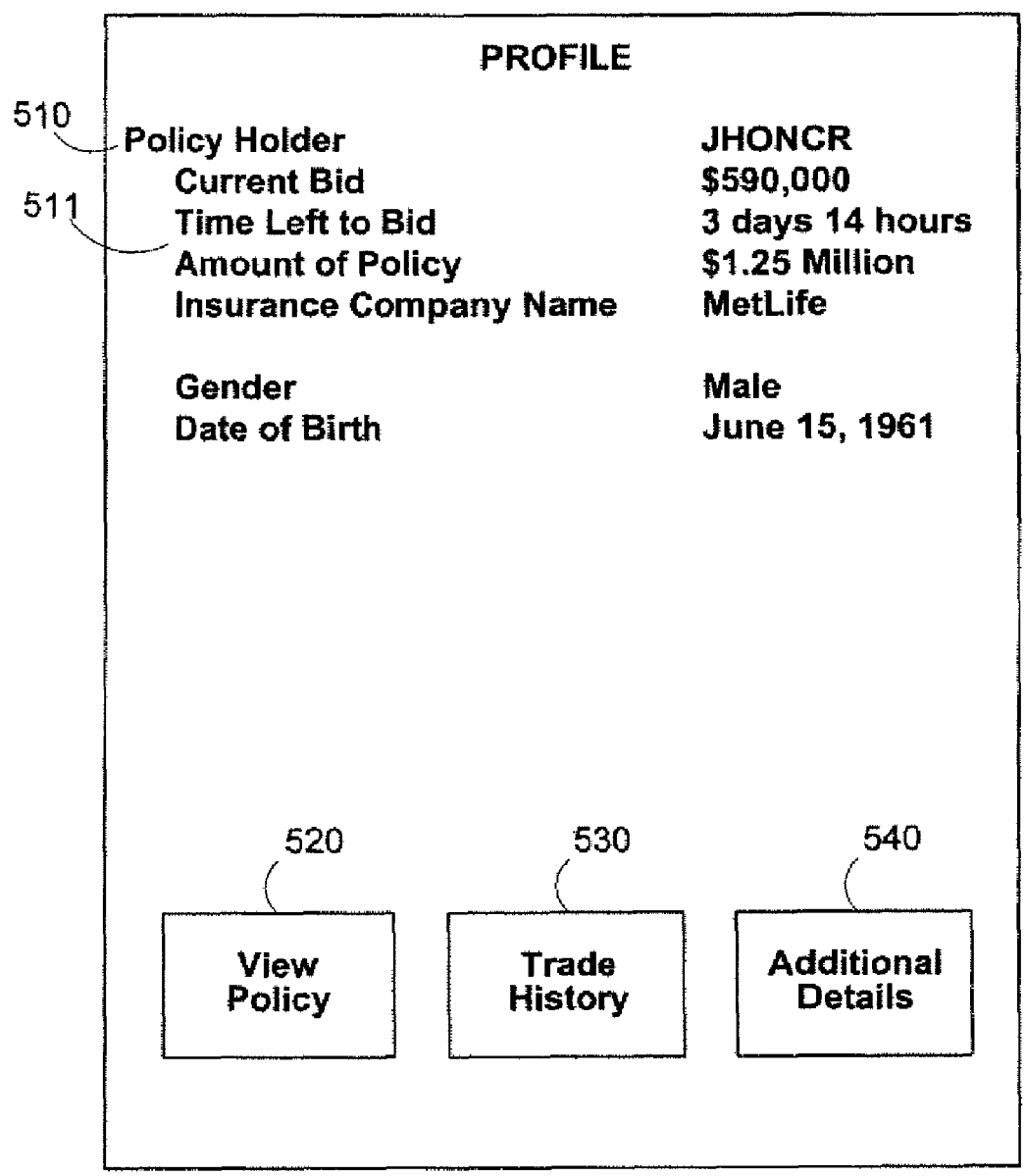
FIG. 5 illustrates a portion of a life settlement profile in accordance with an embodiment.

Listing the policy at step 350 may include the creation of the policy profiles shown in FIGS. 5 and 6. Step 350 may generate a database or populate a pre-existing database with any relevant fields of the policy profile or contract. Additionally, any unique fields that can be indexed based on unique aspects of a given policy profile and/or contract or group of policies and/or contracts may be inserted into the database at this step. The step is discussed in more detail in connection with FIG. 12. The unique aspects may be grouped into an exceptions menu that may be displayed to a user upon request. Also, the listing of the policy and/or contract may include any computations necessary to allow for fast querying and/or trading of the policies and/or contracts in the database as shown in more detail in FIGS. 7 and 8.

Before trading may commence, the system may or may not calculate index values for the policies and/or contracts at step 360. In some embodiments, certain suitable provisions may be standardized. The index values described herein may be calculated using any number of equations that manipulate the values associated with the computation of the policyholder's life expectancy and/or creditworthiness of the policyholder's insurance company, the policy benefits (including values), any values shown in fields of the profile in FIGS. 6 and 7, the pricing of a cluster of policies and/or contracts, etc., or any combination of the same using any number of mathematical equations, functions, formulas, theories, etc. or combination of the same.

The index value may be the calculated value or a value requested by an settlement contract and/or policy seller. This index value may also function as a benchmark for determining the worth of other settlement contracts and/or policies by sellers, insurance companies, purchasers, or any combination of the same.

Users at workstations 101 may interact with servers 104 to trade the instruments shown at step 370. Further demonstration of trading procedures are discussed in the description of FIG. 11.

Figure 4:
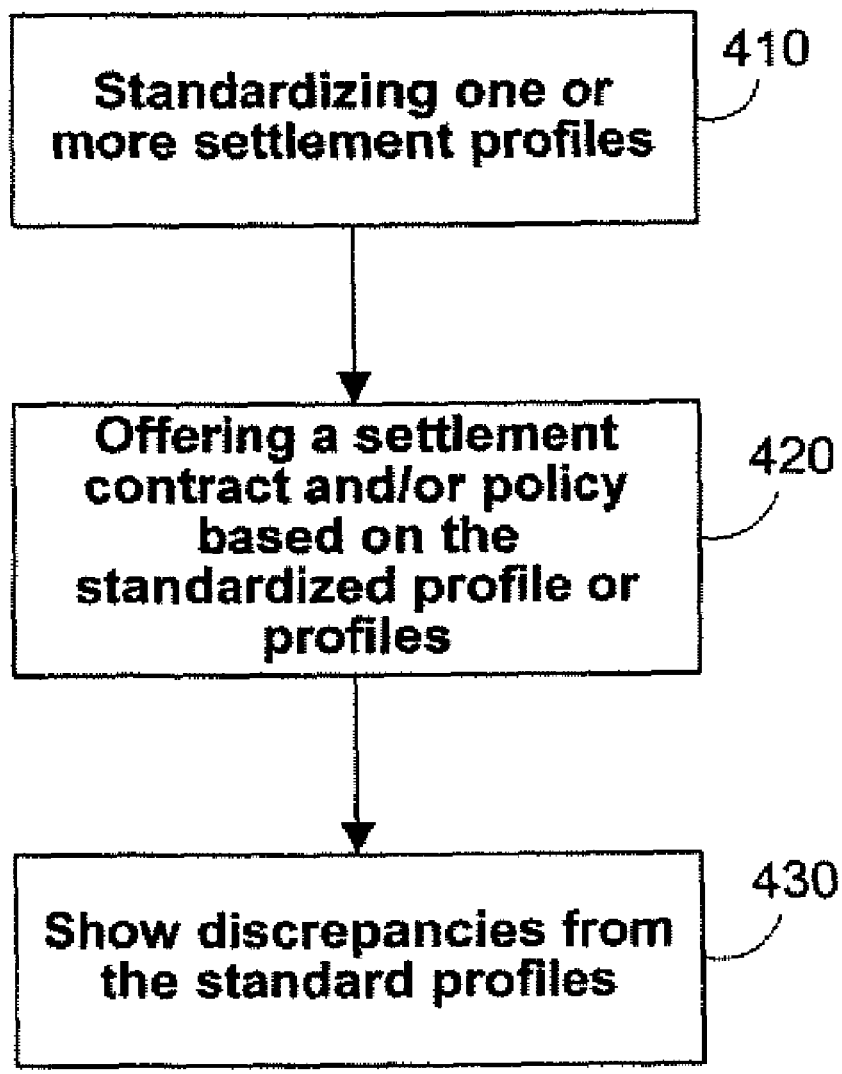
FIG. 4 illustrates a flow chart representing the process of forming a life settlement profile in accordance with an embodiment.

FIG. 4 shows a method 400 according to the invention. The method shows standardizing a life settlement profile at step 410.

The method also shows offering a settlement contract based on the standard life settlement profile at step 420. Additionally, step 430 may or may not be necessary to identify discrepancies between the available information and the standardized profile. Such a discrepancy is illustrated in an example below. In alternative embodiments of the invention, a number of different life settlement profiles may be standardized. A sample output of the standardization of the profile step 410 is shown in FIG. 6.

FIG. 5 shows a sample portion of a settlement profile 500. Settlement profile 500 may be viewed on display 202 of FIG. 2. Profile view 500 may precede settlement profile 600 of FIG. 6 and may include a subset of the fields in FIG. 6. For example, profile view 500 displays a policyholder field 510 which corresponds to field 610. Any field that is included in both profiles, 500 and 600, preferably will include the same information.

One advantage that may be obtained by this particular feature is that while a seller may be interested in observing the trading activity of his policy, a level of separation from the profile details may be desired. For example, the seller may be interested in seeing the last bid amount but may not want to view the life expectancy, credit rating, or any combination of the same. For simplicity, any mention of profile 600 in the rest of the description reflects profile 500 in a similar manner.

Other relevant fields 511 provided in profile 500 may include a current bid—i.e., last bid in the request for quote (RFQ) system, time left to bid, or any combination of the same.

Additionally, profile 500 may include an interactive view policy button 520. The selection of this button by a user may provide a view of the complete insurance policy. However, the complete view may not necessarily include fields that may infringe on a policyholder's privacy. Such privacy related fields can include the policyholder's name, address, and/or other combinations of the same.

Also, profile 500 may include an interactive trade history button 530. When a user selects button 530, the system may provide a listing of one or more previous transactions on record.

Profile 500 may also include an interactive additional details button 540. A selection of this option may present the user with the policy view shown in FIG. 6.

FIG. 6 shows a sample settlement profile 600 generated by a standardization mechanism at step 410. Settlement profile 600 may be viewed on display 202 of FIG. 2. The settlement profile may include fields pertaining to the policyholder 610, insurance company 620, status of the submitted policy and/or contract (not shown), values pertaining to last bid price 640, ask price 641, and/or last sale price 642. In addition, the profile may include values present in the profile or generated by the system that may be unique to the profile. Such unique attributes may be entered into or detected by the system. For example, if a policy is valued at an extraordinary amount, the system may display such an amount as the unique aspect of the profile. As another example, policies that may have been issued by providers to residents of different locations may vary in terms of legal requirements from municipality to municipality, state to state, or country to country. Accordingly, the system may display such requirements as unique aspects of a particular profile. Similarly, any other suitable non-standard clause may be included as a unique aspect of a particular profile.

The usefulness of the fields shown in settlement profile 600 become apparent in the later discussion of the settlement contract and/or policy selection shown in FIG. 7. The policyholder fields 611 may include gender, date of birth, height, weight, tobacco or nicotine use, marital status, occupation, race, religion, geographic location, life expectancy, identification of the individual who evaluated the life expectancy, identification of the individual who evaluated consistency, etc., or any other information or combination of the same. Fields pertaining to the insurance company of the policyholder are shown in fields 621 and may include the company name, policy amount, date of maturation, premium payment amount, number of payments remaining, the insurance company's rating, policy's cash value, the type of policy, etc., or any other information or combination of the same. Other fields (not shown) that relate to the status of the policy and/or contract status, and the unique aspects that may be generated based on any of the above criteria may also be included in this profile view.

It should be noted that in some instances, certain fields of the profile may not be available. These discrepancies may be marked with "XXXX", or other suitable notation, as shown for the Religion field 611 in profile 600.

The current trading prices such as bid price 640, ask price 641, last sale price 642, or any other relevant trading information or combination of the same is determined by server 104 and a query of the current market values.

Some of the fields shown in FIG. 6 may not be applicable to all embodiments of the invention but are shown for illustrative purposes. For example, fields 640, 641, and 642 may not be applicable and therefore may not be displayed in embodiments that relate to a request for quote environment, discussed later in this section.

The fields shown in the settlement profile 600 are not necessarily required by the invention, they are shown for illustrative purposes only and are not meant to limit the invention in any way.

Other fields may add or replace fields shown in 611, or 621, or any combination or other fields. Examples of other fields may include information relating to the appearances of the individual—i.e. hair color, eye color or any combination of the same. Also, examples of other fields in 621 may include values pertaining to the insurance company history such as net worth. Examples of other values relating to trading information may include percent change of the previous closing price.

Figure 12:
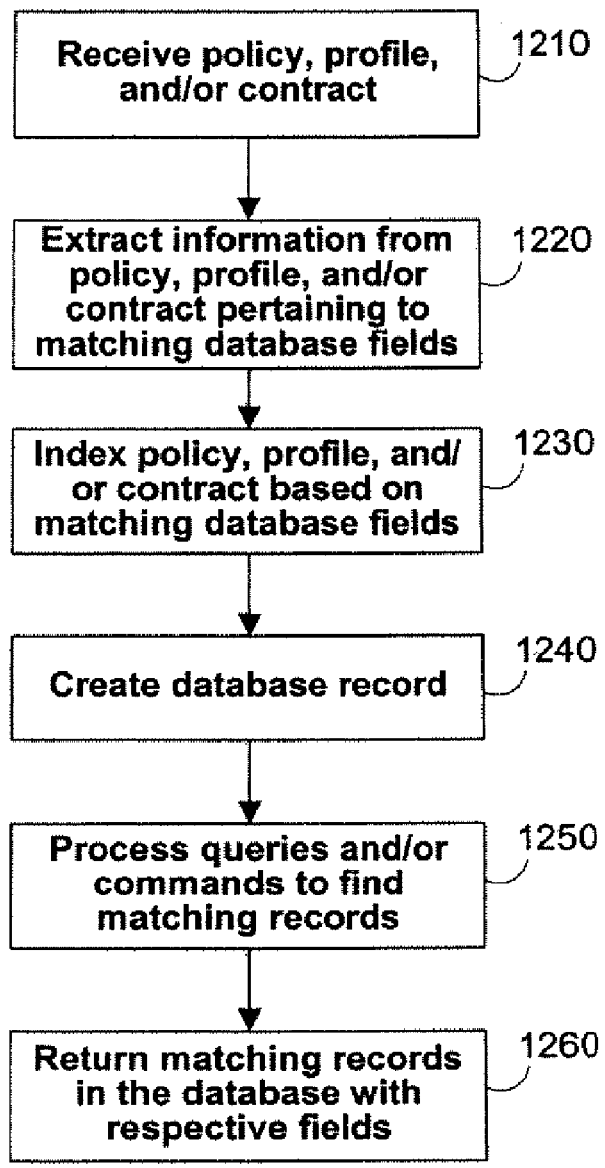
FIG. 12 illustrates a flow chart representing the process of generating and querying a profile database in accordance with some embodiments of the present invention.

FIG. 12 illustrates a flow chart 1200 representing the process of generating and querying a profile database. Using a database system to store information provides the ability to perform fast and accurate query of information. The database may be have any number of fields. Such fields may include any of the criteria in a policy profile shown in FIGS. 5 and 6, as well as fields not shown but described herein, or any other relevant information pertaining to an insurance policy. For example, the fields in the database may include the policy's settlement symbol, the policyholder's name, gender, date of birth, height, weight, tobacco or nicotine use, marital status, occupation, race, religion, geographic location, life expectancy, identification of the individual and/or entity which evaluated the life expectancy and/or medical condition or status, identification of the individual and/or entity which evaluated consistency, quality and/or integrity of the offering, the name of the insurance company issuing the policy, its rating, the policy's date of maturation, premium amount, its cash value, type, the number of payments remaining, the bid price, the ask price, the last sale price, policy and/or contract submission or trade status, or any other relevant trading and other information. There may also be a field (hereinafter, "uniqueness") that includes information that is generated based on any of the above criteria or other unique aspects of the profile as discussed above.

Initially the system may receive the submitted policy, profile, and/or contract at step 1210. Afterwards, at step 1220, the system may extract any information in the policy, profile, and/or contract that matches the database fields. Any information that may not be available may be interpreted by the system as "XXXX", or other suitable notation. At the next step 1230, the database may be populated by indexing the matching fields. A field for which corresponding information is not available may be populated using "XXXX", or other suitable notation for the entry. A new record may be created at step 1240 in the database with those respective database fields populated. At this point, it may be said that the record is indexed and can be queried.

A user may search (i.e., query) a database at any point for any combination of fields that exist in the database, as will be apparent in the description of FIG. 7. The user may do so by querying specific criteria within particular fields. After the database receives the query at step 1250 it may process the query as a command and may determine which of the records match the request. At step 1260, the database may return all the fields pertaining to any record, or any combination thereof, that match the query. This will be more apparent in the illustrative example that follows.

In this example, an exemplary database may have two fields. The two fields in the exemplary database may be the type of insurance policy and the height of the policyholder. Three policies, A, B, and C, are submitted to the system at step 1210. The policies each contain the following information. Policy A has insurance policy type "universal", the height of the policyholder is "5'7"", and the policy amount is "$1.2 Million". Policy B has insurance policy type "universal", the height of the policyholder is "5'5"", and the policy amount is "$1.3 Million". Policy C has insurance policy type "term", the height of the policyholder is "5'4"", and the policy amount is "$1 Million".

After receiving the policies at step 1220, the information that matches the fields in the database may be extracted. In this example, the database does not have a policy amount field. Accordingly, the corresponding information in the policies may not be extracted. The system may extract the information in each policy pertaining to insurance policy type and height of the policy holder. The system may then index this information at step 1230 and create a corresponding record at step 1240. The database may now process queries and match any of the fields for the three profiles in the database.

If, in this example, a query requests all the records having "universal" as the insurance policy type, the database may process this query at step 1250 and return at step 1260 the two records that have "universal" as their insurance policy type, namely A and B. If, in this example, a query is made requesting "universal" type insurance or a height less than "5'5"", the database may process this query at step 1250 and return all three records at step 1260, namely A, B, and C. It should be noted that the above example is meant for illustrative purposes and in no way should be understood to limit the invention.

Any information contained in the fields of a record, such as the policy profile symbol, may be extracted from the records a user receives. Such information may be used to locate, view, and/or trade the policy profile and/or contract that is on the system.

FIG. 7 shows a graphical user interface 700 according to the invention that may be used to query a database and select settlements contracts and/or policies relating to buying or selling life settlements. Graphical user interface 700 may be viewed on display 202. The interactive screen section 710 displays an area in which the user (who may be an individual submitting their policy to the system, a broker selling a policy for a policyholder, or any other suitable entity) may select any combination of information pertaining to a policyholder 711 that may appear in policyholder information section 611 of settlement profile 600. The fields 713 pertain to the policyholder that appears in interactive screen 710. Fields 713 may correspond to fields 511 and 611 available in settlement profile 500 or 600. Any fields that cannot be viewed 715 in the interactive screen may be scrolled down/up to be displayed, using the interactive button 712, which enables a user to either scroll up or down the fields pertaining to policyholder 711. The entries and values 714 inputted by a user pertaining to fields 713 are displayed alongside their respective field. A user may alter the entries or values by either using scroll button 716 or any suitable text input device, such as a keyboard, PDA, voice recognition, etc., or any combination of the same.

The interactive screen section 720 displays an area in which the user may select any combination of information pertaining to an insurance company 721 that may appear in insurance company information section 621 of settlement profile 600. The fields pertaining to the insurance company 722 that appear in interactive screen 720 may correspond to the fields available in settlement profile 600. Any fields that cannot be viewed 715 in the interactive screen may be scrolled down/up to be displayed, by using the interactive button 723, which enables a user to either scroll up or down the fields pertaining to insurance company 721. The entries and values 725 inputted by a user pertaining to fields 722 are displayed alongside their respective field. A user may alter the entries or values by either using the scroll button 724 or any suitable text input device, such as a keyboard, PDA, voice recognition, etc., or any combination of the same.

The interactive screen section 760 displays an area in which the user may select any combination of information pertaining to the trade information 761 that may appear in trade information section 640 of settlement profile 600. The fields pertaining to the trade information 762 that appear in interactive screen 760 may correspond to the fields available in settlement profile 600. Any fields that cannot be viewed 715 in the interactive screen may be scrolled down/up to be displayed, by using the interactive button 764, which enables a user to either scroll up or down the fields pertaining to trade information 761. The entries and values 765 inputted by a user pertaining to fields 762 are displayed alongside their respective field. A user may alter the entries or values by either using the scroll button 763 or any suitable text input device, such as a keyboard, PDA, voice recognition, etc., or any combination of the same.

Similarly, an interactive screen (not shown) may display to a user an exceptions menu that includes the unique aspects of policy profiles and/or contracts. This exceptions menu may or may not include a listing of unique aspects of all the records in the database. This listing may be determined by querying a database for all the "unique" field entries containing distinct entries at step 1250 of FIG. 12. Selection and query of any of the fields in this list may return any profile and/or contract that has the selected unique aspect at step 1260, as detected and/or generated by the system.

Any criteria that the user wishes to leave open or does not want to have impact the settlement profile and/or contract search results either way, may be marked by inputting "NONE" in the relevant entries or values fields 714, 725, 735, 765. For example, if a user inputs "NONE" for all the available fields and performs a query at step 1250, the database may return a list at step 1260 of all the profiles on server 104.

Once a user has completed entering all the criteria they wish to have queried, the button 750 allows a user to perform a query at step 1250 through all the settlement profiles in the database which is on server 104 and displays the matching results returned at step 1260, i.e., any and/or all the fields of the matching records, in a display window 740.

A user that may want to see the profile for any of the listed profiles may select one or more of the listed profiles, i.e., by choosing the policy symbol field(s) shown, and receive an organized representation of one or more settlement profile data as shown in FIGS. 5 and 6.

A user may also request to see a complete listing of all the trade information pertaining to one or more of the listed settlement profiles. Interactive button 770 may allow a user to generate a display with an organized representation of all the trade information pertaining to one or more matching profiles as shown in FIG. 9.

Figure 8:
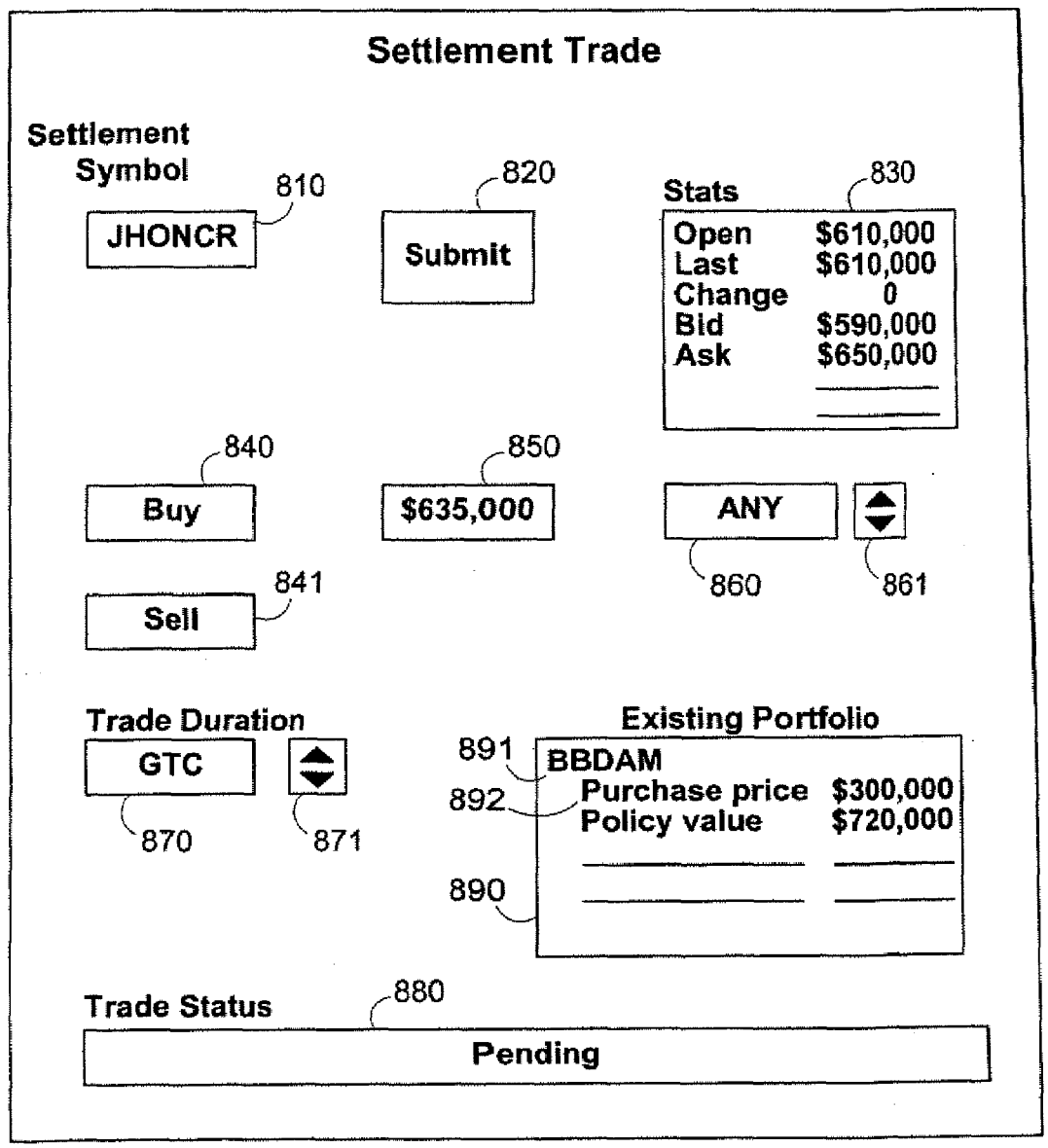
FIG. 8 illustrates an interface for placing a settlement contract trade in accordance with an embodiment.

Any user of the system may place trades relating to life settlement contracts and/or policies according to the invention using the graphical user interface 800 shown in FIG. 8. A user may input one or more symbols in the symbol selection box 810 pertaining to any particular settlement contract and/or policy that is on system 100. The symbol may be inputted using any text input device such as a keyboard, PDA, drop-down selection box, voice recognition, or any combination of the same. When the user has inputted all the symbols pertaining to settlement contracts they wish to trade or view, the submit button 820 may cause the real-time trade information statistics for one or more symbols to be displayed in the interactive display 830.

Information related to trade statistics may be queried in the database. This may be done by querying the database for any trade statistics of a record for a given settlement profile symbol. The database may then search and find all the records that may match that symbol at step 1250 and return any of the information contained in those field(s) that pertain to that symbol at step 1260.

For example, an alphanumeric identifier may be associated with a particular individual's policy. The relationship between the identifier and the insured may be known only to select few such as, for example, the insured, and the insured's physician. In some embodiments, the settlement symbol JHONCR has been inputted and shown in symbol selection box 810. The respective settlement contract trade statistics are presented in real-time interactive statistics display 830. The presented real-time trade statistics correlate to the real-time market shown in FIG. 9 and respective database record fields. The settlement symbol is presented in column 910 and one or more of the real-time trade statistics relating to the given symbol is/are displayed in their respective columns. In this example it is shown that in column 920 the market OPEN price is $610,000 and corresponds to what is displayed in viewable display 830. The statistics in FIG. 8 are shown for illustrative purposes and may or may not include the listed items depending on the embodiment of this invention. For example, in embodiments that implement requests for quotes, as discussed later in this section, the ask price may not be displayed.

The above example is meant for illustrative purposes only and in no way limits the invention. For example, one skilled in the art may choose to have real-time trade information statistics displayed in the viewable display 830 without the user interacting with the system. Such that a the real-time trade information statistics may be displayed as soon as a symbol in selection box 810 is recognized by system 100. This may eliminate the need for SUBMIT box 820.

The user may decide to buy or sell one or more settlement symbols chosen in selection box 810. The interactive BUY button 840 and interactive SELL button 841 serve this purpose. The selected price for the buy/sell trade is inputted into text box 850 by the use of any text input device such as a keyboard, PDA, drop-down selection box, voice recognition, or any combination of the same. A user in this case has chosen a price of $635,000 shown in 850 for settlement symbol JHONCR shown in 810. When the user selects the BUY button 840, system 100 may update the field in the database for the record that has JHONCR as the settlement symbol field. The price of $630,000 pertaining to symbol JHONCR in a real-time manner is therefore, placed in the database and set as the current bid price if it is higher than any previous real-time bid price for that record in the database. Conversely, if the user selects the sell button 841 system 100 places the price shown in text box 850 as the ask price for the record with the field matching the selected symbol in the database.

Additionally, the user is presented with a trade type drop-down box 860 which has its selections changed using the scroll button 861. Using this selection box the user may have the option to buy ANY settlement symbol at a chosen price. For example, if ANY is selected in drop-down box 860, the system performs a database query and buys any record pertaining to a settlement in the database that has an ask price of $635,000 shown in text box 850. Other options may include MARKET trades which precludes any value shown in text box 850 and performs a sell/buy trade at the given bid/ask price for one or more selected symbols in settlement symbol selection box 810. Other embodiments may be created. For example, one skilled in the art may choose to have any plurality of trade options in trade type selection box 860 without departing from the scope and spirit of the invention. For example, other trade types may include LIMIT trades, which do not buy/sell any settlements/profiles beyond the given limit selected in text box 850.

The trade duration may be selected in the selection box 870 and changed using the scroll button 871. Options may include but are not limited to "good till cancelled" (GTC) or "one day only" (ODO). When a trade is placed on system 100 its status may be displayed in the viewable display screen 880. In this case the status of the trade pertaining to the record with matching settlement symbol JHONCR is returned by the database trade status field as PENDING indicating that the trade has yet to execute and thus, purchased or sold by another party.

A user may also be presented with a viewable screen 890 displaying one or more settlement contracts and/or policies purchased by the user (i.e., the user's portfolio). The user's portfolio is displayed with the owned settlement symbol(s) 891 and relevant statistics information 892. Relevant statistics information 892 may include the purchase price, policy value, policyholder information, insurance company information, or any values given in settlement profile 600 and/or queried in the database.

An organized representation of one or more settlement contracts and/or policies is shown in FIG. 9. The user may be presented with one or more settlement symbols in column 910. Each settlement symbol has a respective trade statistic associated with it. Examples of some trade statistics relating to the settlement may include the OPEN price 920, the HI/LOW values for a period of time 930, LAST closing price 940, the CHANGE amount 950 from closing price, the current BID price 960, the current ASK price 970, the POLICY AMOUNT 980, or any combination of the same. The settlement symbols may be presented in a plurality of organizations not limited to what is shown in FIG. 9. For example, the settlement symbols may be presented in descending/ascending order according to CHANGE amount 950, or any combination of other numerical fields, or alphabetically according to settlement symbol 910, or any combination of the same.

Advantages of systems and methods according to the invention include allowing purchasers to trade one or more life settlement contracts and/or policies electronically. Thus people with settlement contracts may potentially sell their investment sooner for a higher price than was initially purchased and may not be required to wait for the termination of the policy or the policyholder's death to make a profit. Similarly, people looking to purchase settlement contracts may browse a plurality of available profiles electronically to determine what they think is the best investment opportunity. This is one example of electronically trading life settlement contracts according to the invention.

Alternatively, as discussed briefly above, systems and methods according to the invention may be applicable to any type of insurance policy, annuity, disability, or other suitable instrument. Additionally, a derivatives based market may be created allowing the derivatives to be searched and paged in a similar way to the settlement profiles described herein.

Figure 10:
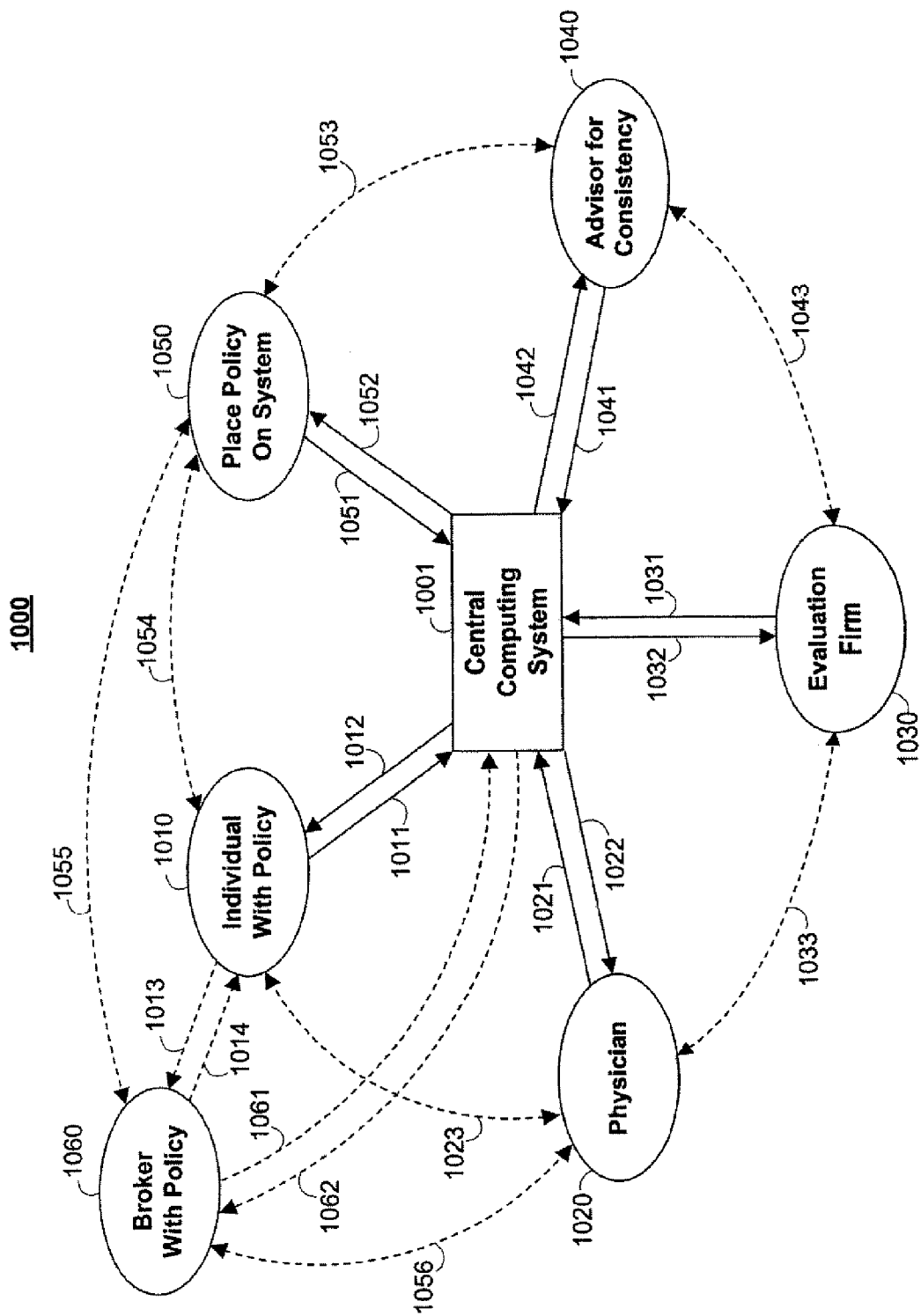
FIG. 10 illustrates a flow diagram representing the interactions among the parties involved in the electronic settlement trading in accordance with an embodiment.

In a preferred embodiment, trades may be performed on life insurance policies for creating life settlement contracts. Additionally, trades may be performed for the beneficial interest on the life insurance policies. FIG. 10 shows a flow diagram 1000 representing the interactions that may take place in the system. The interactions shown may be necessary for an insurance policy to be obtained and submitted to server 104 to facilitate the creation of a life settlement contract. It should be noted that the solid lines represent a preferred embodiment of the invention. However, the dotted lines represent interactive paths that may be used in alternative embodiments. These alternate interactive paths may provide the same or similar advantages as the invention.

A central computing system 1001 may act as the central hub in this system. System 1001 may handle all the necessary communications or transmissions in order to submit or check the status of one or more policies and/or contracts on server 104 of FIG. 1.

Initially, system 1001 may interact with an individual holding one or more life insurance policies 1010. Individual 1010 may wish to submit one or more policies on server 104 to receive bids. An exchange may require that the individual electronically or otherwise provide to 1001 one or more policies, a letter of release, name of his physician, or any combination of the same represented by 101 1. In return, system 1001 may provide the individual with a unique identifier, cash, shares of stock, bonds, one or more annuities, or any recurring periodic or other suitable payment, or other value-bearing asset, or any combination of the same (immediately or at some later date), represented by 1011. The unique identifier may be a symbol, number, encrypted code, or any combination of the same.

If the individual receives a value-bearing asset of any of the forms described above immediately, the individual may be relieved of ownership of the policy. For example, in the case the individual terminates one or more policies early, the individual may receive the value-bearing asset immediately. Similarly, the system may purchase one or more policies from the individual prior to placing one or more policies for trade or auction, and, in this case, may also offer a value-bearing asset immediately. It should be noted that there may be other situations where value-bearing assets of any of the forms described above may be remitted to the policyholder. For example, the policy holder's insurance company may instead provide the insured with some shares of stock, bonds, one or more annuities, or any recurring periodic or other suitable payment instead of a lump-sum cash payment to terminate the policy as an incentive for not trading the policy. Alternatively, a third party may offer some shares of stock, bonds, one or more annuities, or any recurring periodic or other suitable payment instead of a lump-sum cash payment in order to purchase the policy.

Referring back to FIG. 10, alternatively, the individual may provide a broker 1060 which may include any suitable (trader or any other person) with one or more policies, a letter of release, name of his physician, or any combination of the same represented by 1013. In return, individual 1010 may receive cash, a unique identifier, shares of stock, bonds, one or more annuities, or any recurring period or suitable payment, or other value-bearing asset, or any combinations of the same (immediately or at some later date), represented by 1014. If the individual receives a value-bearing asset of any of the forms described above immediately, the individual may be relieved of ownership of one or more policies. For example, in the case the individual terminates one or more policies, the individual may receive the value-bearing asset immediately. Similarly, the system may purchase one or more policies from the individual prior to placing one or more policies for trade or auction, and, in this case, may also offer a value-bearing asset immediately. As above, it should be noted that there may be other situations where value-bearing assets of any of the forms described above may be remitted to the policyholder. If the individual interacts through broker 1060, exchanges with system 1001 through 1011 and 1012 may not be necessary. In turn, 1011 and 1012, may be replaced by 1061 and 1062.

System 1001 may facilitate the performance of a medical evaluation as the next step. The system may provide the individual's physician 1020 with the unique identifier of the individual, the individual's name, and any combination of the same represented by 1022. Physician 1020 performs a medical evaluation on individual 1010 and sends the evaluation to system 1001. The medical evaluation the physician sends is represented by 1021 and may be based on physical health— e.g., illnesses, any medical condition as such, etc., drug or alcohol use, marital status, gender, age, height, weight, occupation, race religion, geographic location, or any other suitable characteristic. A physician should be understood for the purposes of this application to include any other suitable care provider or other person capable of providing the service described above. Alternatively, or in addition, the system may facilitate the performance of any other evaluation through any other evaluating entity.

In this preferred embodiment, prior to the purchase of the policy, the individual's name and unique identifier may be known only by individual 1010, the broker 1060, and physician 1020. For security and privacy purposes, no other entity (except for the ultimate purchaser of the policy) may be allowed to obtain the matching of the individual's name or social security number (or other suitable personal information) with the unique identifier. The identification of the record (which has any privacy related information removed as discussed previously in this section) associated with the individual may be solely accessible by the unique identifier. Alternatively, a unique identifier may not be required.

In an alternative embodiment of the invention, identification of the individual may always or substantially always be kept hidden from the purchaser. Furthermore, in such a transaction, a third party, other than the insured and the purchaser, or similar entity may be appointed to maintain the information relating to the insured. As stated above, this information may be kept secret from the purchaser even after the consummation of the transaction.

System 1001 may interact with an evaluation firm 1030 represented by 1031 and 1032 to receive a life expectancy of the individual. The individual's unique identifier and the medical evaluation may be provided to a firm 1030. After firm 1030 completes the evaluation of the individual, 1030 may return a life expectancy of the individual to system 1001.

A consistency check, or any other anti-fraud or similar integrity-checking service that the system selects or requires to insure the proper and equitable functioning of the system may be performed by an advisor for consistency 1040 or other suitable entity. This check may be necessary to ensure evaluation performed by physician 1020 is consistent with the original evaluation provided by one or more policies and is necessary to insure the credibility and maintain the integrity of the system. The request and response by system 1001 and advisor 1040 are represented by 1041 and 1042.

The final step may be placing one or more policies and/or contracts on server 104, represented by 1050. System 1001 may perform a plurality of computations as described earlier in this section that may determine a rating, index value, create a profile and/or cluster of profiles for trading, or any combination of the same. Interactions necessary for submitting the policy to server 104 are represented by 1051 and 1052.

Further description of the interaction of policyholders and purchasers is included below in relation to FIGS. 11A and 11B.

Individual 1010 or broker 1060 may receive the status of one or more policies and/or contracts after submission to system 1001. System 1001 may return, in response to a status request, using, for example, one or more unique identifier, information pertaining to the activity on one or more policies and/or contracts. Information that may be returned may include the latest known information from any entity involved in the process and any steps that remain in the submission of the policies and/or contracts. For example, if one or more policies are submitted and are undergoing medical evaluation, the activity returned may be any available information from the medical evaluator. Additionally, the next step returned, in this case, may be the life expectancy evaluation. The life expectancy evaluation may follow the medical evaluation and, therefore, may not have been performed. Accordingly, the next step presented to a user may be an incomplete life expectancy, along with other incomplete or complete steps. When the status of one or more submitted policies and/or contracts is requested, system 1001 may return known information pertaining to a medical evaluation, life expectancy evaluation, consistency evaluation, completion of one or more policies' submission, or any combination of the same. Additionally, the system may return and/or list the number of incomplete steps or the steps remaining in the submission.

In alternative embodiments of the invention, each of entities 1010, 1060, 1020, 1030, 1040, and 1050 may interact with each other either electronically or otherwise. These types of interactions may eliminate the need for system 1001 to perform certain operations. For example, individual 1010 or broker 1060 may interact with physician 1020 represented by 1023 and 1056 respectively. These interactions may eliminate the need to submit a physician's name to system 1001.

Additionally, physician 1020 may interact directly with evaluation firm 1030 through 1033. This interaction may eliminate the need to submit a medical evaluation to system 1001.

Similarly, evaluation firm 1030 may interact directly with advisor 1040. This may also eliminate the need to provide the system with a life expectancy evaluation.

Advisor 1040 may have access to submit a policy to server 1004 represented by interaction 1053. This may eliminate the need for system 1001 to submit the policy to server 104 for trading. Similarly, it may be desired to allow the individual or broker to submit one or more policies to server 104 through interactions 1054 and 1055 respectively. The individual or broker may submit one or more of his life insurance policies or life settlement contracts independent of the system.

It should be noted that modifications to the interactions and step sequences may be made to the system by one skilled in the art. However, these modifications may not necessarily depart from the scope and spirit of the claimed invention.

In other embodiments, one or more insurance policies or the beneficial interest on one or more insurance policies and/or contracts may be traded in an RFQ trading environment. A policyholder may wish to determine the best selling price of one or more of their policies before engaging in a life settlement with a purchaser. In such a situation, the policyholder submits one or more policies to server 104. After one or more policies are submitted to the server, purchasers may view and/or bid on the policy.

Policies that are submitted or listed on the server may have a plurality of attributes associated with them. Such attributes may include a predetermined time period for which the listings are available (hereinafter "active state"). This predetermined time period may be set by policyholders or current sellers. Setting a particular value for the active state allows other purchasers to view and/or bid on one or more particular policies and/or contracts only while the listing is active. The last bid on one or more policies and/or contracts at the end of the active state may be the purchase price for one or more policies and/or contracts. It should be noted that there may be a predetermined time period for the policyholder not to accept the last or highest bid.

Additionally, one or more policy and/or contract listings may have a preset minimum bid amount ("reserve price"). This amount may be presented to a purchaser. During the time that the listings are active purchasers place bids. However, if during the active state no bids reach the minimum amount set for the listings, the policies and/or contracts may not be purchased.

Options and fields provided in the RFQ trading environment may be set to suit any requester's trading needs. For example, purchasers and policyholders may view the current statistics of one or more policies and/or contracts on the system. Such statistics may include the highest bid amount, list of bidders, list of bids, date of bids, or any combination of the same.

Purchasers may browse the available policies and/or contracts in a variety of ways. One such way is performing queries to the database based on criteria. Such criteria may include policyholder's age, gender, height, weight, policy amount, highest bid, bid history, time left to bid, race, religion, geographic location, policy date of maturation, insurance company, any combination of previously discussed database fields, or any combination of the same. One skilled in the art may create a variety of other queries without departing from the scope and spirit of the claimed invention.

After a purchaser has identified one or more policies and/or contracts of interest, a bid may be placed. The bid a purchaser places should be higher than the current highest bid amount. If the bid exceeds the maximum bid amount the current bid may become the highest bid on one or more policies and/or contracts. The system preferably allows purchasers to track their bids on and/or contracts in a similar fashion as the sellers.

In some embodiments, the sellers may decide to end the active state at any period in time. The choice to end the RFQ early may give the current highest bidder purchase rights. However, the seller may also cancel any bids on the listings.

At the end of the active state of the listings the highest bidder may be given information relating to the purchase of one or more policies and/or contracts. Such information may include the policyholder's name, address, or any combination of the same which may not be available during the active state of the listings. The purchaser may then perform the exchange with the policyholder thereby forming the life settlement—e.g., exchanging funds to become the beneficiary of one or more policies and/or contracts.

After creating the life settlement contract the purchaser may decide to trade the beneficial interest on one or more policies and/or contracts. In such a situation the purchaser takes on a similar role as the policyholder described previously. In this situation, it may not be necessary for the seller to undergo all the steps in creating a life settlement from an insurance policy. Examples of steps that may not be necessary can include medical evaluations, letters or agreements, consistency checks, evaluation of the medical evaluations, or any combination of the same.

In some situations, the policyholder may wish to rescind the life settlement. If this is the case he may do so during a particular time period—i.e., policyholders are given 15 days to rescind any life settlement contract. This particular action may in turn cancel the life settlement contract.

This method and system provides a way for a policyholder to obtain a maximum bid price for one or more policies and/or contracts. Enabling the public to view and purchase a plurality of life settlements creates price transparency which in turn creates liquidity and greater competition. The liquidity may increase the bid price for the settlement or other suitable product.

Figure 11A:
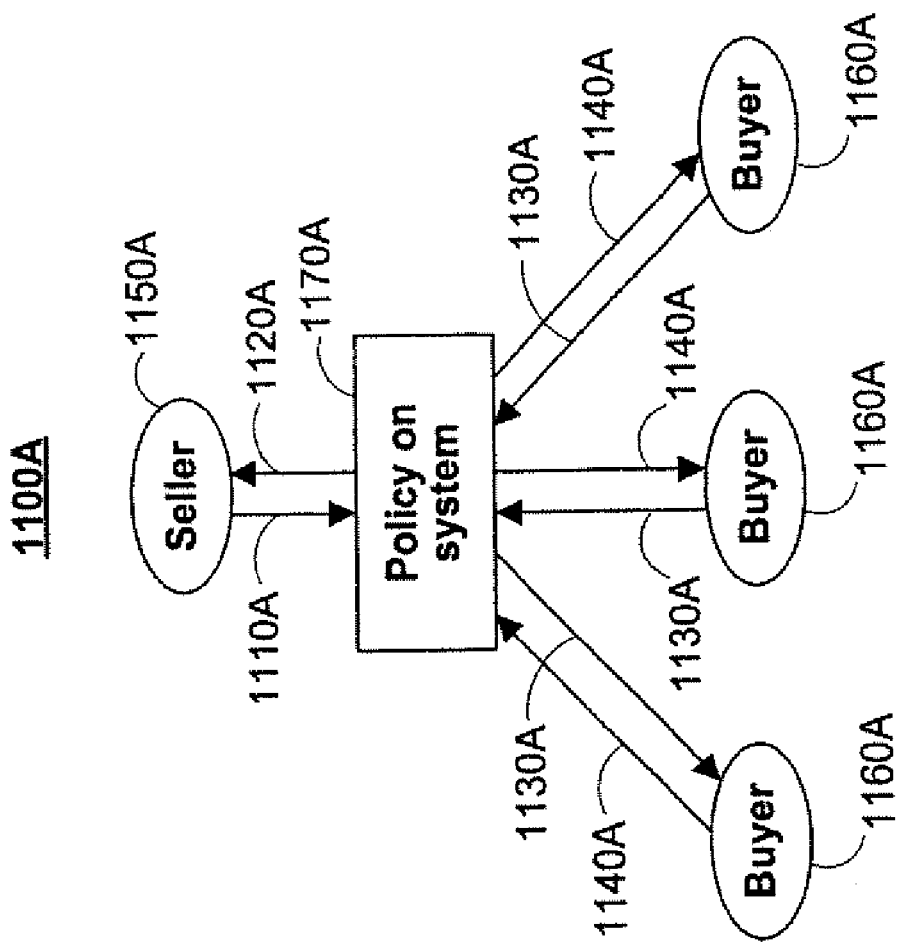
FIGS. 11A and 11B are illustrations of flow diagrams representing the interactions among purchasers and sellers in the trade and creation of life settlements in accordance with an embodiment.
Figure 11B:
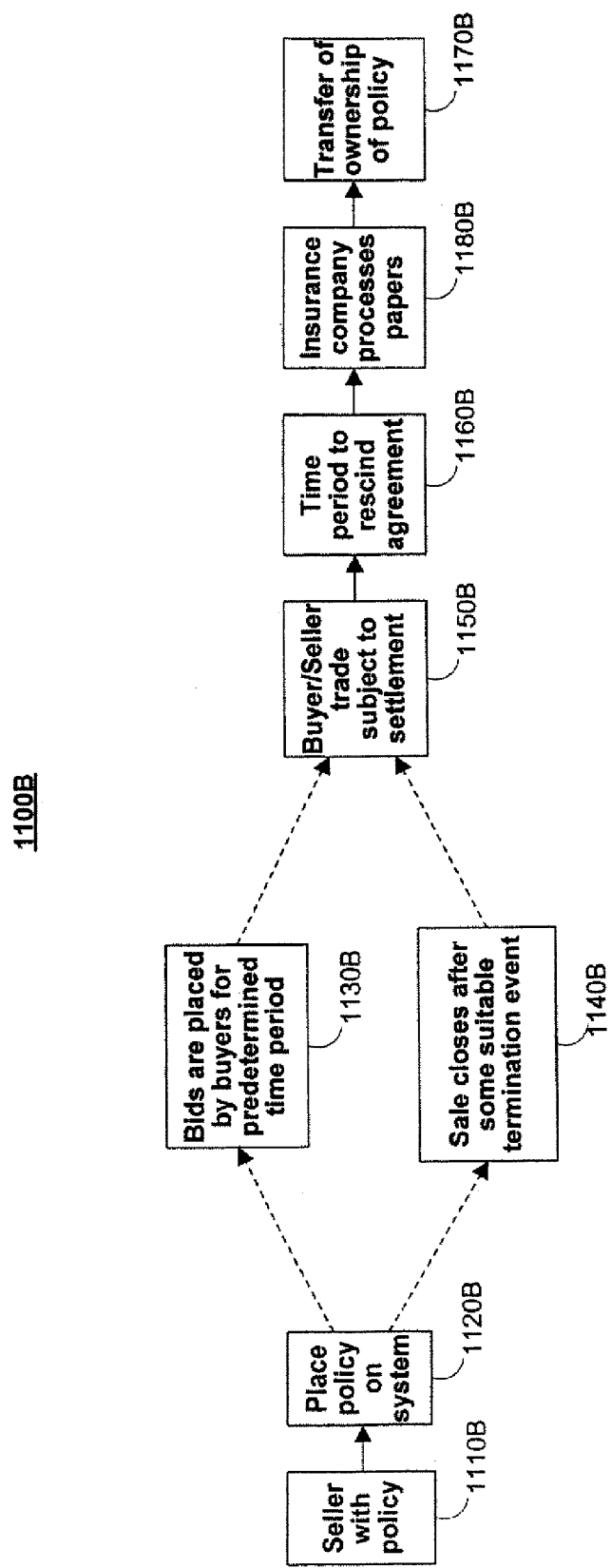

FIGS. 11A and 11B show flow diagrams representing the interactions among purchasers and sellers 1100A in the trade and creation of life settlements 1100B (and/or life settlement contracts). After all the interactions described in FIG. 10 are complete and the seller's 1150A one or more policies and/or contracts are submitted on the system 1170A, represented by 1101A, trading may commence.

Diagrams 1100A and 1100B represent two ways in which purchasers and sellers may interact to trade insurance policies and/or contracts. Diagram 1100A shows a flow diagram in which the seller submits one or more policies and/or contracts to the system for bidding by the purchasers. Once bidding has ended the settlement contract is finalized. Alternately, diagram 1100B, shows a flow diagram in which purchasers and sellers trade back and forth. However, the settlement contract in this situation may not be finalized until a later date.

Initially, a potential purchaser(s) 1160A may view the current statistics and relevant information one or more policies and/or contracts on 1170A, represented by 1130A. If the purchaser(s) is interested in purchasing one or more policies and/or contracts on system 1170A, he may place a bid may be placed 1140A. At a predetermined time period, or after the close of trading as dictated by the seller, seller 1150A may end the bidding and the highest bidder among 1160A may purchase one or more policies and/or contracts. However, during the time the policy and/or contract is open for bidding, purchaser(s) 1160A may compete and outbid one an other. For example, if one purchaser places a bid of $160,000 for a policy and/or contract on system 1170A, another bidder may wish to place a higher bid of $165,000. If the time for bidding has not ended, the initial bidder may choose to raise the bid to $170,000.

After the seller 1110B submits one or more policies and/or contracts to the system 1120B, the seller may receive bids on one or more policies and/or contracts for a predetermined time period 1130B and the sale closes after the predetermined period of time has elapsed. Alternatively, after the seller 1110B submits one or more policies and/or contracts to the system 1120B, the sale may close after another suitable termination event 1140B (e.g., the seller accepts a current bid or the seller decides to close the auction). In either case, the procedure of finalizing the sale may begin after 1130B or 1140B. It should be noted that the dotted lines represent suitable alternative paths from system 1120B to buyer and seller trade 1150B. Alternatively, any other suitable path from system 1120B to buyer and seller trade 1150B may be provided.

To finalize the sale, system 1120B may provide the purchaser and seller with private information which may be required for creating the life settlement contract. Thereafter, the buyer and seller trade 1150B after agreeing to the terms and conditions set forth, in the settlement contract.

After the trade is made, further trades may be made between the buyer and seller. After the close of trading, there may or may not be a time period for the seller to rescind the life settlement contract 1160B, thereby canceling the agreement. During this time period, further trades may be placed.

Soon after time period to rescind 1160B passes, if the seller does not rescind, the insurance company may process the necessary papers 1180B. In the final step there may be a transfer of ownership of one or more policies and/or contracts 1170B. It is this step that completes the sale of one or more insurance policies and/or contracts and enables the purchaser to further re-sell one or more policies and/or contracts to other purchasers if he so chooses.

In alternative embodiments of the invention, derivative financial instruments—i.e., financial contracts whose values depend on, and are derived from, the value of an underlying asset, reference rate, or index may be formed using a life settlement, or a group of life settlements, as the underlying instrument or instruments. For example, a group of life settlements, each that includes an insured having similar characteristics, may be bundled together to form a single instrument. Thereafter, the bundle may be used as the underlying group of assets of an index. The index may serve as a basis for swaps, forwards, futures, puts, calls, swaptions, caps, floors, collars or any other similar derivative contract. These are only examples of possible embodiments of the invention with respect to derivative contracts and should not be understood to limit the invention.

Modifications to the system and method may be performed by one skilled in the art without departing from the scope and spirit of the claimed invention.

What is claimed is:

1. A method comprising:
   receiving, from a remote device, information about a settlement contract that is available for sale, in which the settlement contract is based on a life insurance policy of a policyholder;
   storing, using a processor, the information about the received settlement contract into a plurality of fields in a database, in which the processor and the remote device are in communication over a network and the database comprises information about a plurality of other settlement contracts;
   generating, using the processor, an index for the plurality of fields, in which the index is used for processing queries;
   receiving, from the remote device, a query that is based on at least one field;
   retrieving, using the processor, a first settlement contract that comprises information matching the at least one queried field;
   communicating to a plurality of potential purchasers, via the processor, that the first settlement contract is available for purchase;
   receiving, during a pre-determined period of time, at the processor a plurality of bids for the first settlement contract, in which each of the plurality of bids comprises a bid price;
   determining, using the processor, that a first bid price submitted by a first bidder is higher than any other bid prices that were received during the pre-determined period of time;
   transmitting, using the processor, an indication that an agreement to sell the first settlement contract at the first bid price has been made; and
   providing, using the processor, the policyholder of the first settlement contract with an opportunity to rescind the agreement.

2. The method of claim 1 further comprising:
   naming the first bidder as a beneficiary of the first settlement contract's life insurance policy, in exchange for receiving funds at the first bid price.

3. The method of claim 1 further comprising:
   receiving a request to rescind the agreement; and
   canceling the agreement.

4. The method of claim 1 further comprising:
   determining a life expectancy of the policyholder; and
   determining a creditworthiness of an insurance company that is providing the life insurance policy.

5. The method of claim 4 further comprising:
   assigning, using the processor, a rating to the received settlement contract based on at least the life expectancy of the policyholder and the creditworthiness of the insurance company, in which the rating determines at least in part a price of the received settlement contract.

6. The method of claim 4, in which the act of determining the life expectancy of the policyholder further comprises:
   performing a medical evaluation of the policyholder.

7. The method of claim 1 further comprising:
   assigning a minimum bid amount for each settlement contract that is stored in the database.

8. An apparatus comprising:
   a processor; and
   a memory, in which the memory stores instructions which, when executed by the processor, direct the processor to:
   receive, from a remote device, information about a settlement contract that is available for sale, in which the settlement contract is based on a life insurance policy of a policyholder;
   store the information about the received settlement contract into a plurality of fields in a database, in which the processor and the remote device are in communication over a network and the database comprises information about a plurality of other settlement contracts;
   generate an index for the plurality of fields, in which the index is used for processing queries;
   receive, from the remote device, a query that is based on at least one field;
   retrieve a first settlement contract that comprises information matching the at least one queried field;
   communicate to a plurality of potential purchasers that the first settlement contract is available for purchase;
   receive, during a pre-determined period of time, a plurality of bids for the first settlement contract, in which each of the plurality of bids comprises a bid price;
   determine that a first bid price submitted by a first bidder is higher than any other bid prices that were received during the pre-determined period of time;
   transmit an indication that an agreement to sell the first settlement contract at the first bid price has been made; and
   provide the policyholder of the first settlement contract with an opportunity to rescind the agreement.

9. The apparatus of claim 8, in which the memory stores instructions which, when executed by the processor, direct the processor to:
   name the first bidder as a beneficiary of the first settlement contract's life insurance policy, in exchange for receiving funds at the first bid price.

10. The apparatus of claim 8, in which the memory stores instructions which, when executed by the processor, direct the processor to:
    receive a request to rescind the agreement; and
    cancel the agreement.

11. The apparatus of claim 8, in which the memory stores instructions which, when executed by the processor, direct the processor to:
    determine a life expectancy of the policyholder; and
    determine a creditworthiness of an insurance company that is providing the life insurance policy.

12. The apparatus of claim 11, in which the memory stores instructions which, when executed by the processor, direct the processor to:
    assign, using the processor, a rating to the received settlement contract based on at least the life expectancy of the policyholder and the creditworthiness of the insurance company, in which the rating determines at least in part a price of the settlement contract.

13. The apparatus of claim 11, in which the act of determining the life expectancy of the policyholder further comprises performing a medical evaluation of the policyholder.

14. The apparatus of claim 8, in which the memory stores instructions which, when executed by the processor, direct the processor to:
assign a minimum bid amount for each settlement contract stored in the database.

15. An article of manufacture comprising:
a storage medium, in which the storage medium stores instructions which, when executed by a processor, direct the processor to:
receive, from a remote device, information about a settlement contract that is available for sale, in which the settlement contract is based on a life insurance policy of a policyholder;
store the information about the received settlement contract into a plurality of fields in a database, in which the processor and the remote device are in communication over a network and the database comprises information about a plurality of other settlement contracts;
generate an index for the plurality of fields, in which the index is used for processing queries;
receive, from the remote device, a query that is based on at least one field;
retrieve a first settlement contract that comprises information matching the at least one queried field;
communicate to a plurality of potential purchasers that the first settlement contract is available for purchase;
receive, during a pre-determined period of time, a plurality of bids for the first settlement contract, in which each of the plurality of bids comprises a bid price;
determine that a first bid price submitted by a first bidder is higher than any other bid prices that were received during the pre-determined period of time;
transmit an indication that an agreement to sell the first settlement contract at the first bid price has been made; and
provide the policyholder of the first settlement contract with an opportunity to rescind the agreement.

16. The article of manufacture of claim 14, in which the storage medium stores instructions which, when executed by a processor, direct the processor to:
name the first bidder as a beneficiary of the first settlement contract's life insurance policy, in exchange for receiving funds at the first bid price.

17. The article of manufacture of claim 14, in which the storage medium stores instructions which, when executed by a processor, direct the processor to:
receive a request to rescind the agreement; and
cancel the agreement.

18. The article of manufacture of claim 14, in which the storage medium stores instructions which, when executed by a processor, direct the processor to:
determine a life expectancy of the policyholder; and
determine a creditworthiness of an insurance company that is providing the life insurance policy.

19. The article of manufacture of claim 18, in which the storage medium stores instructions which, when executed by a processor, direct the processor to:
assign, using the processor, a rating to the received settlement contract based on at least the life expectancy of the policyholder and the creditworthiness of the insurance company, in which the rating determines at least in part a price of the settlement contract.

20. The article of manufacture of claim 18, in which the act of determining the life expectancy of the policyholder further comprises performing a medical evaluation of the policyholder.

21. The article of manufacture of claim 14, in which the storage medium stores instructions which, when executed by a processor, direct the processor to:
assign a minimum bid amount for each settlement contract stored in the database.

* * * * *